United States Patent [19]
Gould et al.

[11] Patent Number: 6,065,138
[45] Date of Patent: May 16, 2000

[54] COMPUTER ACTIVITY MONITORING SYSTEM

[75] Inventors: Brian J. Gould, Plainsboro; Steven D. Rudnik, Chester, both of N.J.

[73] Assignee: Magnitude LLC, Plainsboro, N.J.

[21] Appl. No.: 08/779,934

[22] Filed: Jan. 7, 1997

Related U.S. Application Data

[60] Provisional application No. 60/014,463, Mar. 29, 1996.

[51] Int. Cl.[7] .............................. H02H 3/05; G06F 3/00
[52] U.S. Cl. ........................... 714/47; 702/176; 702/186; 710/18
[58] Field of Search ................................ 395/838, 926; 364/551.01, 569; 713/200, 201; 710/15–18; 702/176, 186; 714/47

[56] References Cited

U.S. PATENT DOCUMENTS

| | | | |
|---|---|---|---|
| 5,218,704 | 6/1993 | Watts, Jr. et al. | |
| 5,305,238 | 4/1994 | Starr, III et al. | 364/569 |
| 5,349,662 | 9/1994 | Johnson et al. | |
| 5,564,015 | 10/1996 | Bunnell | 395/184.01 |
| 5,579,238 | 11/1996 | Krugman | 364/508 |
| 5,625,826 | 4/1997 | Atkinson | 395/750 |
| 5,654,905 | 8/1997 | Mulholland et al. | 364/569 |
| 5,696,702 | 12/1997 | Skinner et al. | 364/551.01 |
| 5,749,372 | 5/1998 | Allen et al. | 128/782 |

*Primary Examiner*—Dieu-Minh T. Le
*Attorney, Agent, or Firm*—Synnestvedt & Lechner LLP

[57] ABSTRACT

A computer activity monitoring system is disclosed for monitoring a user's input on a computer having a processor, memory, and input unit. The system functions by first initializing an activity status indicator in the memory. Next, the activity of the operator's input device is measured over a time period to determine an activity rate. The activity rate is then compared to at least one limit selected from the group consisting of a work limit and a rest limit. If the activity rate is greater than the work limit, then the activity status indicator is adjusted according to a first function. If the activity is less than the rest limit, then the activity status indicator is adjusted according to a second function. A warning is indicated if the activity status indicator reaches a predetermined alarm level. Also disclosed is an apparatus for performing this method and a computer readable medium, such a floppy disk, hard drive, CD ROM, or tape, having instructions for performing this method.

19 Claims, 5 Drawing Sheets

COMPUTER ACTIVITY MONITORING SYSTEM

REFERENCE TO PROVISIONAL APPLICATION

This application relates to a provisional application, Application No. 60/014,463, filed on Mar. 29, 1996, entitled "Computer Activity Monitoring Program."

BACKGROUND OF THE INVENTION

1. Field of Invention

The present invention relates generally to a system for monitoring the activity rate of a user on a computer input device. More specifically, the invention relates to a system that resides in a computer and monitors a user's activity rate and warns the user when a rest is warranted to reduce repetitive stress injury (RSI).

2. Background

Repetitive stress (or strain) injury (RSI) is a classification of diseases caused by the excessive use of joints. It is a subclassification of Cumulative Trauma Disorder (CTD). One common form of RSI is Carpal Tunnel Syndrome (CTS) which can be caused by excessive typing among other activities. The carpal tunnel is a channel in the wrist where tendons and the median nerve connect the arm to the hand. Through excessive use, the tendons become swollen and pinch the nerve. RSI typically manifests itself only after years of excessive typing. Furthermore, the pain of RSI frequently is delayed, and, thus, a person may type comfortably all day but experience great pain later in the evening.

RSI accounts for a large portion of work-related illnesses, and the incidence of RSI is expected to grow as the number of people operating keyboards increases. The impact of RSI is measured not only in the pain and suffering of its victims, but also in time lost from work and medical costs. If surgery is required for both hands, medical costs can become particularly high. Moreover, while surgery and medication may alleviate some of the symptoms, there is no cure.

RSI is caused not by the computer input devices, but rather by the user's behavior. Intense typing, that is, typing for long periods without a break, slowly damages the soft tissues of a person's hands, wrists, and arms. Due to its insidious nature, RSI often remains undetected until irreparable injury is sustained. RSI may be avoidable or minimized, however, through proper work habits. One way of avoiding carpal tunnel syndrome involves typing less and/or taking frequent breaks. A need therefore exists for a system that monitors a user's input activity level and prompts him to rest before sustaining injury. The present invention fulfills this need among others.

SUMMARY OF THE PRESENT INVENTION

The present invention is directed to a monitoring and prompting system which reduces the risk of Repetitive Stress Injury (RSI) faced by people using input devices of the type commonly associated with computers. The system operates on a computer having a processor, memory, and input means. The system functions by first initializing an activity status indicator in the memory. Next, the activity of the operator's input device is measured over a time period to determine an activity rate. The activity rate is then compared to at least one limit selected from the group consisting of a work limit and a rest limit. If the activity rate is greater than the work limit, then the activity status indicator is adjusted according to a first function. If the activity is less than the rest limit, then the activity status indicator is adjusted according to a second function. A warning is indicated if the activity status indicator reaches a predetermined alarm level. Other embodiments of the invention include an apparatus for performing this method and a computer readable medium, such a floppy disk, hard drive, CD ROM, or tape, having instructions for performing this method.

Therefore, the present device monitors computer usage patterns over time and warns the user when to break a dangerous trend in repetitive usage of an input device, such as a keyboard or mouse. Warnings or prompts take the form of pop-up windows that appear on the user's screen at appropriate times.

Although breaks should be taken, it is understood that often they are not practical. For this reason, multiple warning levels may be used wherein each warning corresponds to an alarm level of particular severity. If the user ignores one warning and continues working, the system will continue to monitor input and warn the user when a higher level alarm is reached.

Since warnings may interfere with the user's thought process at the instant they occur, a busy allowance timer may be set. This timer will delay the warning until the timer has expired or the system remains idle for a predetermined period of time, e.g., three seconds.

Another embodiment of the invention involves a stretch timer that warns the user that he has been sitting for an extended period and should stand up to stretch. This warning is based on time and not activity rate. Within the stretch timer, the user can set parameters which will reset the stretch timer if the system is completely idle for a user-defined period of time.

Still another embodiment of the invention involves a logging feature. The logging features provides an record of the user's typing rate. Such a record may be beneficial not only for ensuring that the user has rested adequately, but also for monitoring the user's activity from a productivity perspective.

In yet another embodiment, when warnings occur, the system will provide informative and/or entertaining pictures, text and sounds through the use of plug-in modules. These modules may be integral to the device or discrete after market packages. They can even be created by the user using the configuration module. The present invention therefore provides an early warning system to avoid RSI. By observing its warnings, the user can reduce the chance of RSI, rather than waiting until the disease manifests itself—which is often too late.

BRIEF DESCRIPTIONS OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The monitoring and prompting system of the present invention (herein "monitoring system") enables a user to regulate his activity rate on a computer. The system does not require specialized computer hardware or software. It is designed to operate on conventional computers using conventional operating platforms.

Figure 1:
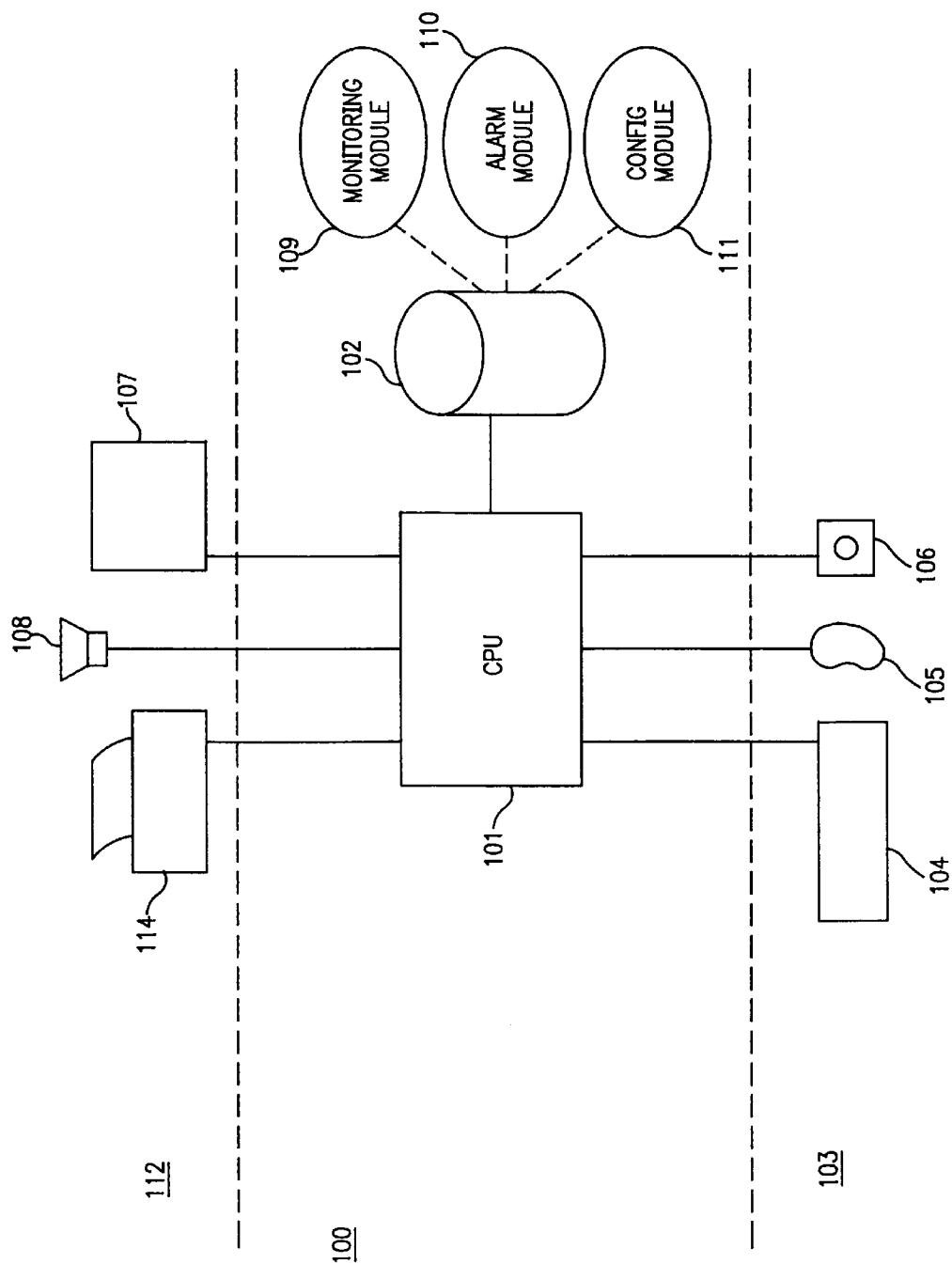
FIG. 1 shows a schematic view of the overall system.

A schematic view of a typical system 100 is shown in FIG. 1. In this figure, a CPU 101 is operatively connected to operator input means 103 and operator display means 112. The operator input means 103 includes any device which requires physical manipulation by the user to input information into the CPU 101 such as a keyboard 104, a mouse 105, or a joystick 106. The operator display means 112 includes any device that provides output to the operator such as a monitor 107, speaker 108, or printer 114.

Operatively connected to the CPU 101 is memory 102 which contains a program or instructional means for the system 100 to perform the process of the present invention. The instructional means may also be stored in a computer readable medium or in a combination of mediums such as disk, tape, ROM or RAM memory.

In one embodiment, the program comprises three modules—namely (1) a monitoring module 109, (2) an alarm module 110, and (3) a configuration module 111 as shown in FIG. 1. When configured with the monitoring module 109, the computer has monitoring means for determining a user's activity rate by measuring and recording the activity of the input means over a predetermined time. This measurement can be performed periodically or continuously. The user's activity rate may be examined to monitor the performance of the user. In one embodiment, the monitoring means compares the activity rate to an alarm limit. When configured with the alarm module, the computer has alarm means for indicating a warning if the activity rate reaches an alarm limit. The configuration module 111 is used to customize the monitoring means and the alarm means.

Figure 2:
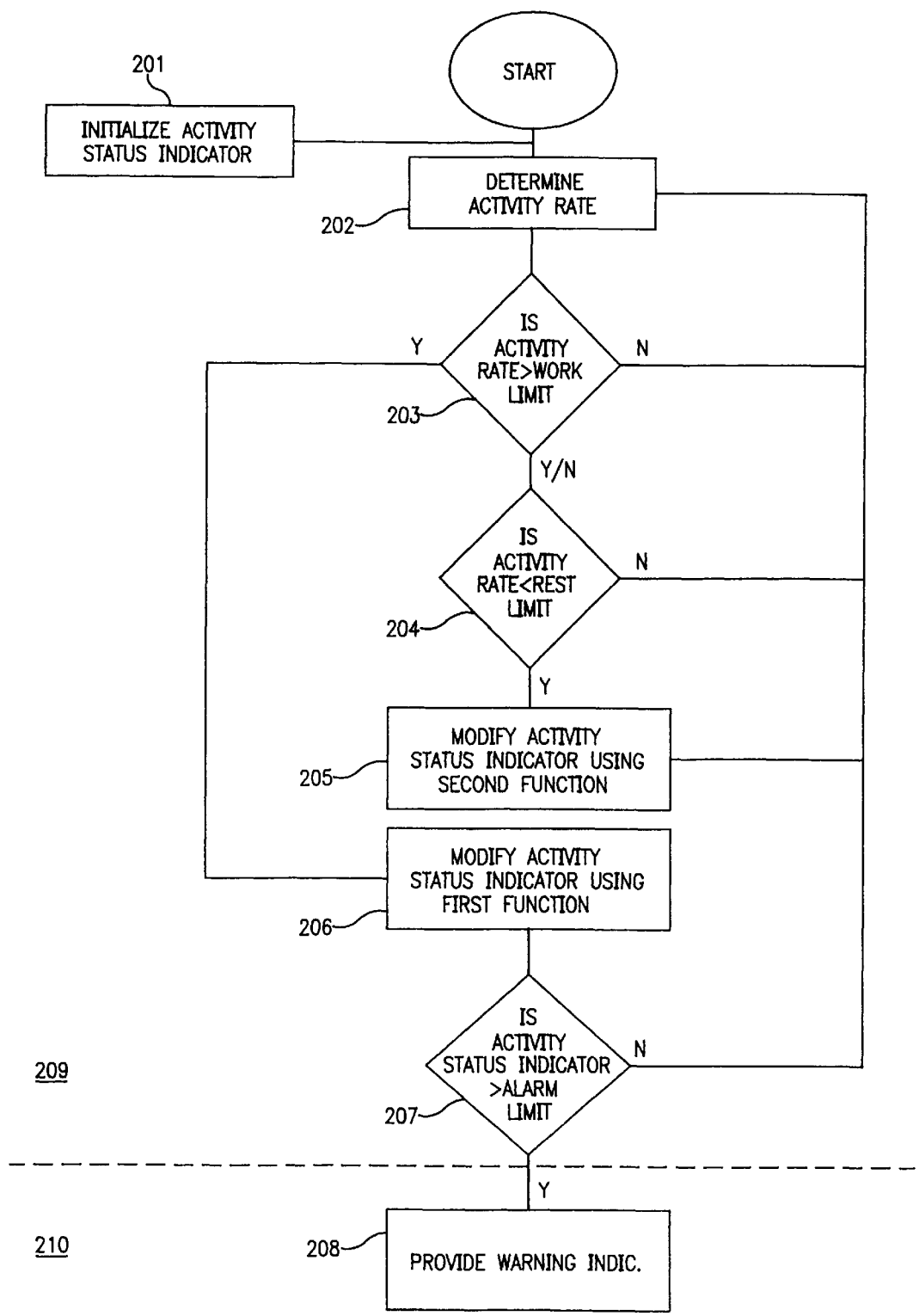
FIG. 2 shows a general flow diagram of the overall process and interaction between the three modules.

A preferred process embodiment of the invention is shown in the flow diagram of FIG. 2. First, in Block 201 of the system's monitoring means 209, an activity status indicator is initiated. Next, Block 202 measures the activity of the operator's input device over a time period to determine an activity rate. The activity rate is then compared to at least one limit selected from the group consisting of a work limit in Block 203, and a rest limit in Block 204. If the activity rate is greater than the work limit, then Block 206 adjusts the activity status indicator according to a first function. If the activity is less than the rest limit, then Block 207 adjusts the activity status indicator according to a second function. A warning is indicated in Block 208 if the activity status indicator reaches a predetermined alarm level as determined in Block 207 of the system's alarm means 210. Each of the modules will now be considered in more detail.

1. Monitoring Module

The Monitoring Module in the preferred embodiment comprises a subroutine for each input device. In a typical system, this involves two separate subroutines—namely, (a) a keyboard monitor and (b) a mouse monitor. Additionally, it is preferred to have (c) a stretch monitor which monitors the user's time working on the computer.

a. Keyboard Monitoring

The keyboard monitor measures the user's activity rate on a keyboard. In the preferred embodiment, individual keystrokes are counted rather than the resulting input of such keystrokes. That is, keystrokes, such as backspace, Alt, Shift, Control and arrow keys, which may not necessarily result in the input of a character, are nevertheless counted. Likewise, a key which is held down is counted as a single keystroke even though it may result in multiple character input.

Figure 3:
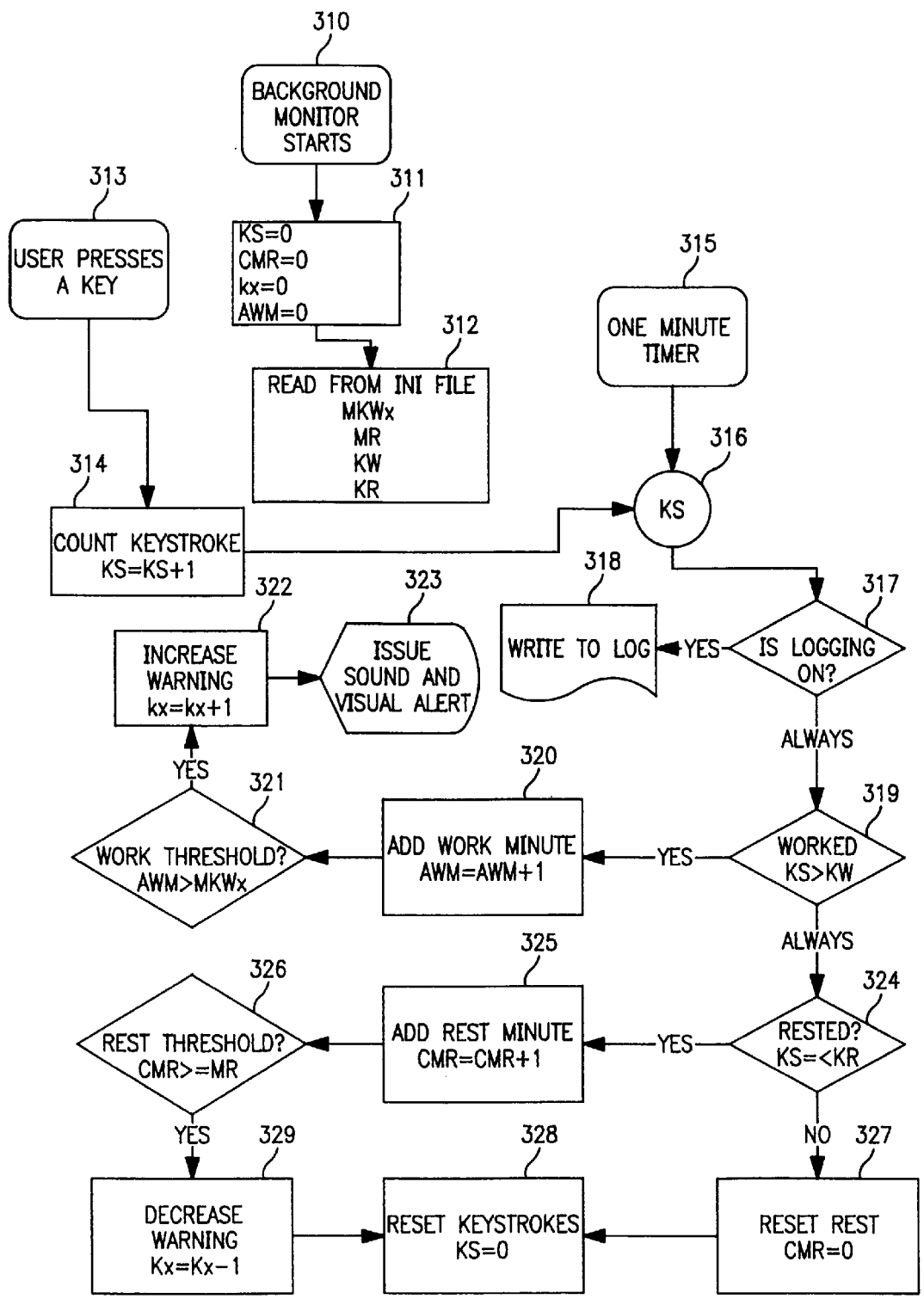
FIG. 3 shows a flow diagram of the keyboard monitoring subsystem.

One embodiment of the keyboard monitor is depicted in the FIG. 3 as a flow chart. In Block 310, the background monitor is started. Next, Block 311 sets the following values to zero: down keystrokes counted in a minute (KS) (also referred to as "the activity rate"), current activity status level (KX), consecutive minutes of rest (CMR), and accumulated keyboard work minutes (AWM). Block 312 initializes the following according to the user's configurations: minutes of work to promote next alarm level (MKWx), minutes of rest to demote alarm level (MR), number of keystrokes per minute considered work (KW) (also referred to as the "work limit"), and number of keystrokes per minute considered rest (KR) (also referred to as the "rest limit").

In this particular embodiment, the system operates in one minute intervals as regulated by Block 315. It should be understood, however, that the interval is arbitrary and may be set to any value. Every time the a key is depressed, it is recorded in Block 313. Block 314 counts the number of keystrokes in a period by adding one to KS each time a stroke is recorded in Block 313. After Block 315 times out a minute, the current KS value is acknowledged in Block 316. Block 317 determines if the logging option has been selected (discussed below). If so, a record of the KS value is made in Block 318.

Block 319 determines if KS is greater than KW, the work limit. If so, a work minute is added to AWM in Block 320. Block 321 then determines if the user has exceeded the number needed to ascend to the next activity status level by determining if AWM is greater than MKWx. If so, Block 322 increases the activity status by one (KX=KX+1). It should be understood, however, that the activity status can be adjusted in any manner to meet the user's needs. In this embodiment, once Block 322, increases the activity status by one, an alarm level is reached, and Block 323 issues a warning, which may be audio, visual or both. Although a alarm level was reached in this embodiment by just one incremental increase, it should be understood that this level is configurable. For example, the system may be configured such that activity status must increase by 5 before reaching the alarm level. Additionally, the preferred embodiment of the invention comprises multiple alarm levels, each level corresponding to a particular warning. For example, in a system with five alarm levels, when the activity status graduates from one alarm level to an other, a warning increased severity will be given. It may also be preferred to identify how may work minutes will prompt the next alarm level.

In this particular embodiment, Block 324 determines if KS is less than or equal to KR regardless of the determination in Block 319. It should be understood, however, that this step might be performed only if the user activity did not exceed the activity limit. Likewise, the determination of Block 19 might be performed only if the activity rate is above the rest limit as determined in Block 324.

If Block 324 determines that KS is less than or equal to KR, then a rest minute is added to CMR in Block 325, and Block 326 determines if a rest limit has been reached (CMR>MKWX). If so, the alarm level is reduced by one in Block 329. Block 328 then sets KS back to zero and the process begins again. It should be understood that effect of a rest minute on the alarm level is configurable. That is, a rest minute can decrease the alarm condition by one as in this embodiment, or according to any other function the user specifies (discussed below).

If Block 324 determines that KS is not less than or equal to KR, then Block 327 resets CMR to zero, Block 328 resets KS to zero, and the process begins again.

In many cases, the user will spend time where the number of keys pressed is between the work and rest thresholds. These periods will not move the user closer to the next higher alarm level, nor will they reduce the current alarm level.

In this embodiment, MKWx and AWM cooperate as a first function, and MR and CMR cooperate as a second function. The first function correlates the number of work minutes to the activity status. For example, if MKWx is set to then, then five work minutes must be recorded before the activity status, in this case, is upwardly adjusted by one. It should be understood, that this adjustment is configurable and the status indicator may be increased, decreased, re-initialized, or adjusted in any other way to meet the user's needs. Likewise, MKWx can be set to any value to affect the sensitivity of a work minute on the activity status.

The second function correlates the number of rest minutes to the activity status. For example, if MR is set to five, then five consecutive rest minutes must be recorded before the activity status indicator is, in this case, downwardly adjusted by one. As with the first function, it should be understood, that this adjustment is configurable and the status indicator may be increased, decreased, re-initialized, or adjusted in any other way to meet the user's needs. This particular embodiment of the invention requires that rest minutes be consecutive unlike work minutes. Consequently, once the user has a minute that is not under the rest key count the user must restart resting before the warning level will be reduced. It should be understood, however, that this is a configurable and the user can select whether or not rest periods must be consecutive. Additionally, MR can be set to any value to affect the sensitivity of a work minute on the activity status.

Table 1 contains an example of a user's typing activity and the program's response. In this example, 50 keystrokes or more are considered work, 5 keystrokes or less are considered rest, and 5 rest minutes will reduce the warning level. The accumulated work column shows how many minutes of work are being counted towards reaching the next warning level. Once the number of accumulated work minutes is equal to the next threshold level, an alarm will be initiated. When the number of accumulated rest minutes is equal to the rest period (5 in this case), the accumulated work level will be reset to zero and the current warning level will be reduced by one.

TABLE 1

| Minute | Rate | Work Minute | Rest Minute | Remark | Status |
|---|---|---|---|---|---|
| 1 | 30 | 0 | 0 | between | 0 |
| 2 | 53 | 1 | 0 | work | 0 |
| 3 | 57 | 2 | 0 | work | 0 |
| 4 | 49 | 2 | 0 | between | 0 |
| 5 | 53 | 3 | 0 | work | 0 |
| 6 | 56 | 4 | 0 | work | 0 |
| 7 | 59 | 5 | 0 | work | 1 |
| 8 | 3 | 5 | 1 | rest | 1 |
| 9 | 4 | 5 | 2 | rest | 1 |
| 10 | 2 | 5 | 3 | rest | 1 |
| 11 | 56 | 6 | 0 | work | 1 |
| 12 | 0 | 6 | 1 | rest | 1 |
| 13 | 0 | 6 | 2 | rest | 1 |
| 14 | 0 | 6 | 3 | rest | 1 |
| 15 | 0 | 6 | 4 | rest | 1 |
| 16 | 0 | 0 | 5 | reset | 0 |
| 17 | 55 | 1 | 0 | work | 0 |
| 18 | 57 | 2 | 0 | work | 0 |
| 19 | 32 | 2 | 0 | between | 0 |
| 20 | 56 | 3 | 0 | work | 0 |
| 21 | 0 | 3 | 1 | rest | 0 |
| 22 | 0 | 3 | 2 | rest | 0 |
| 23 | 0 | 3 | 3 | rest | 0 |
| 24 | 0 | 3 | 4 | rest | 0 |
| 25 | 5 | 0 | 5 | reset | 0 |
| 26 | 56 | 1 | 0 | work | 0 |

Note that during minutes 1 and 4 the amount of work was between the work and rest periods. Neither work nor rest minutes were accumulated. During minute 8, the user dropped into the rest range. But then he began working again in minute 11, so the accumulated rest counter was reset to zero—only consecutive rest minutes are counted towards dropping the warning level. Finally, the user rested from minutes 12 through 16 and the warning level was reduced.

b. Mouse Work Monitoring

Unlike keystrokes, mouse activity (or trackball, or other pointing device activity) is not discrete. Rather mouse activity tends to be continuous, and is measured consequently according to time units. For example, if a second is used as the time unit, every time the mouse is moved within a second, that second counts as one "mouse-second." A mouse activity rate can be measured in terms of the number of mouse-seconds over a predetermined period of time. For example, if a user moves a mouse for 45 mouse-seconds within a minute, the mouse activity rate is 45 mouse-seconds/minute. Accordingly, since there are 60 seconds in a minute, the maximum mouse activity rate is 60 mouse-seconds/minute.

The mouse monitor contains configurable parameters that are functionally similar to those of the keyboard monitor. These parameters include a work limit, a rest limit, a first function, a second function, and at least one alarm limit. The functionality/configurability of these parameters therefore will not be repeated here, although it should be understood that such functionality/configurability is intended.

Figure 4:
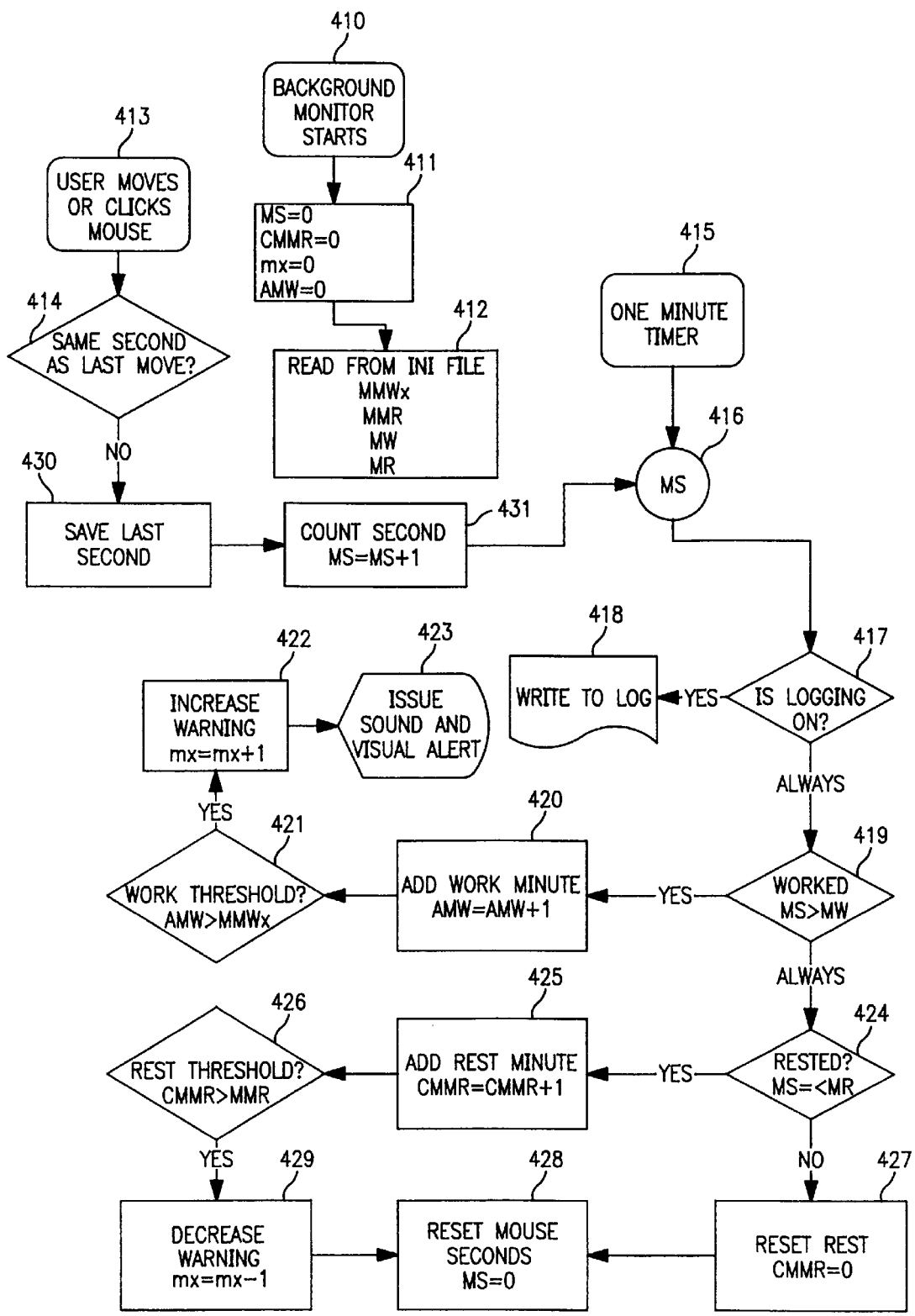
FIG. 4 shows a flow diagram of the mouse monitoring subsystem.

One particular embodiment of the mouse monitor is shown in FIG. 4 in flow chart form, which is similar to FIG. 3. In Block 410, the background monitor is started. Next, Block 401 sets the following values to zero: mouse activity rate (MS) (in this case, mouse-seconds/minute), consecutive minutes of rest (CMMR), and current activity status level (MX). Block 402 initializes the following according to the user's configuration instructions: minutes of work to promote next warning level (MMWx), minutes of rest to demote warning level (MMR), mouse activity rate considered work (MW) (work limit), and mouse activity rate considered rest (MR) (rest limit).

In this particular embodiment as in the keyboard embodiment, the system interval is defined as a minute as regulated by Block 10. As stated above, this is arbitrary and, as such, may be set to any value.

Mouse movement is recorded in Block 113. Block 114 determines if the mouse movement was in the same second as the last mouse movement. If not, Block 130 records the event as a mouse-second. Block 131 counts the number of mouse-seconds in a period by adding one to MS each time a mouse-second is recorded in Block 130. After Block 115 times out a minute, the current MS value, i.e., the activity rate, is recorded in Block 116. Block 117 determines if the Logging option has been selected. If so, a record of the MS value is made in Block 118.

Block 119 determines if MS is greater than MW. If so, a work minute is added to AMW in Block 120 (AMW=

AMW+1). Block 421 then determines if the user has exceeded the number needed to ascend to the next activity status by determining if AMW is greater than MMWx. If so, Block 122 increases the activity status by one (MX=MX+1). As with the keyboard monitor, the alarm level in this embodiment is set to one. Therefore, as soon as the activity reaches one, Block 123 issues a warning, which may be audio, visual or both.

Regardless of the determination in Block 119, Block 124 determines if MS is less than or equal to MR. If so, then a rest minute is added to CMMR in Block 125. Next, Block 126 determines if the number of consecutive rest minutes has reached a level needed to adjust the next activity status by determining if CMMR is greater than MMR. If so, the activity status level is reduced by one in Block 129. Block 128 then sets MS back to zero and the process begins again.

If Block 124 determines that MS is not less than or equal to MR, then Block 127 resets CMR to zero, Block 128 resets MS to zero, and the process begins again. Like the keyboard monitor, this embodiment therefore requires that rest minutes be consecutive unlike work minutes.

The example provided in Table 1 for the keyboard monitor is applicable to the mouse monitor as well, except rather than "keystrokes" it should read "mouse-seconds".

c. Stretch Monitor

The stretch monitor monitors the time at which the user is working at the computer and suggests stretch breaks. Stretching or similar physical stimulation is known to reduce the effects of RSI. Moreover, it provides a break from work which in itself is highly beneficial as discussed above. Every minute that the user works at the computer (including moving the mouse or pressing a key) will be counted as a minute that the user has been sitting at the computer. Once the user has been sitting for a period of time greater than the stretch time, the user will be advised to stand and stretch.

It is possible, however, that the user might get up to make a copy or use the bathroom. In this event, there is a configurable idle minute counter to reset stretch timer. That is, if the PC is untouched for more than the preset idle minutes, e.g., 5 minutes, the stretch timer will reset.

Setting the stretch timer value to zero will disable it. Setting the idle minutes to reset the stretch timer to zero will cause the stretch timer to be invoked every time independent of PC activity. For example, if the stretch timer is set to 90 minutes and the Idle minutes to reset stretch timer is set to zero, the stretch warning will be invoked every 90 minutes regardless of system activity.

Figure 5:
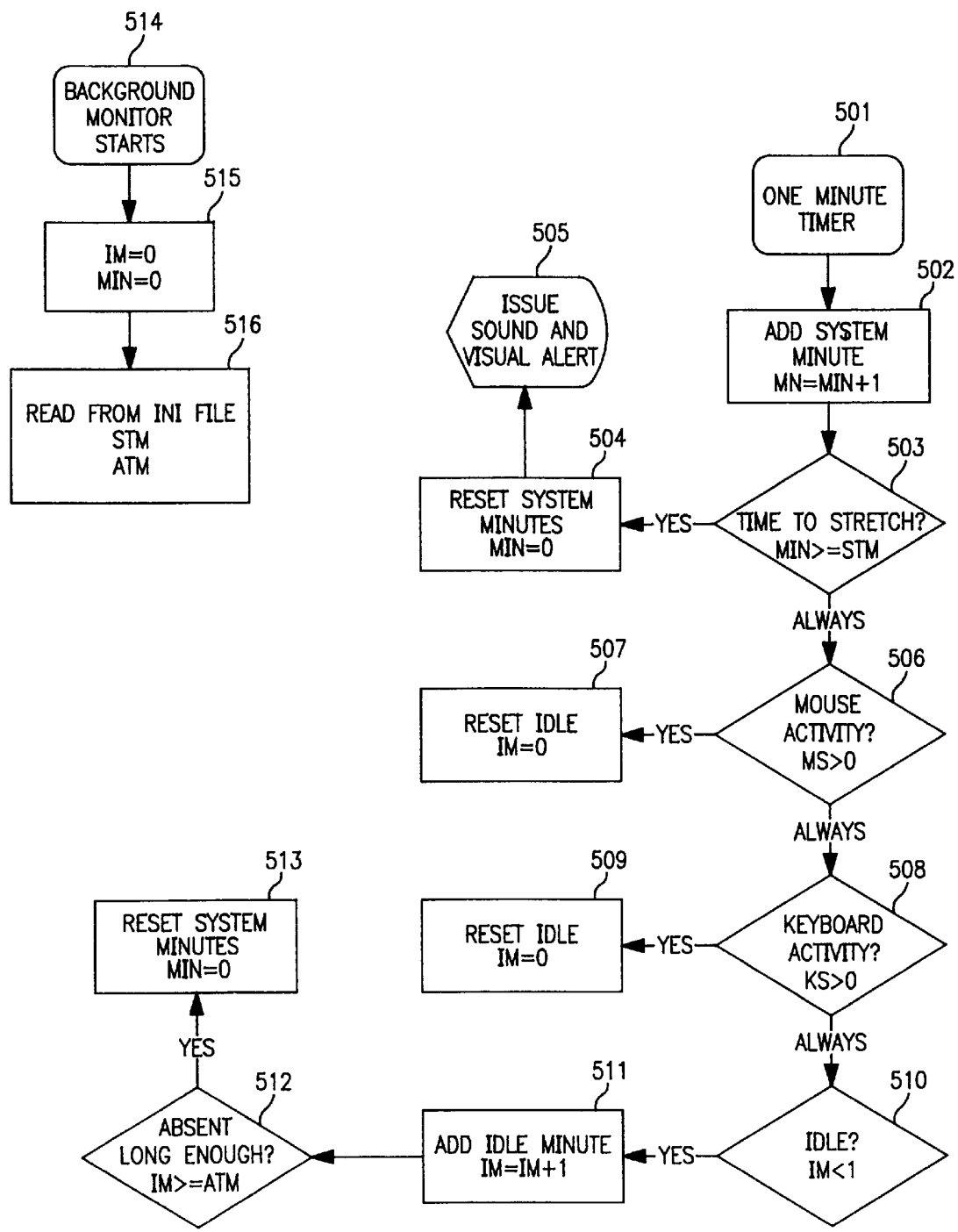
FIG. 5 shows a flow diagram of the stretch timer.

A particular embodiment of the stretch timer is shown in FIG. 5 as a flow chart. To initialize the system, the background monitor starts in block 514. Block 515 zeros the idle minutes (IM) and the minutes since the last stretch (MIN), while Block 516 reads for memory to initialize the values for the minutes to stretch timer (STM) and absent timer minutes (ATM).

The timing interval of the system is set by Block 501, which in this case is one minute. After every minute, a minute is added to MIN in Block 502. Block 503 determines if it is time to stretch by determining if MIN is greater than or equal to STM. If so, Block 504 resets MIN to zero, and Block 505 issues a warning that may be visual, audio, or both.

Regardless of the determination of Block 503, Block 506 determines whether there is mouse activity by determining if MS is greater than zero. If yes, then Block 509 resets IM to zero.

Regardless of the determination of Block 508, Block 510 determines whether the mouse is idle by determining if IM is less than one. If yes, one is added to the current idle minute in Block 511. Next, Block 512 determines if the user has been absent enough by determining if IM is greater than or equal to ATM. If so, Block 513 resets the system minutes to zero. It should be understood that this particular embodiment is for demonstrative purposes and should not be used to curtail the scope of the invention.

2. Alarm Module a. Warning Indications

A warning is provided when an alarm level is reached. As mentioned above an alarm level may be reached due to excessive keyboard or mouse usage, and/or continuous time behind the computer. The basic intent behind this embodiment is to notify the user of the need for a break. Preferably, the user can decide whether to take a break or cancel the warning program before the rest period has been observed.

In an other embodiment, the monitoring system is configured to monitor a user's performance and provide an indication of the user's activity rate for evaluation purposes. One embodiment issues a warning when the user either is working to hard and needs a rest or is not working hard enough and should increase the activity rate.

In the preferred embodiment, a plurality of warnings are used which correspond to alarm levels of increasing severity. If the user ignores one warning and continues to work to the next alarm level, then a second warning will be given which indicates the increased need to take a break. It is preferred that the higher level warnings become more intrusive into the user's work, thereby requiring him to take proactive steps to proceed. For those users particularly prone to RSI, when the highest warning level is reached, the monitoring system can even block further user input until the rest period expires. Alternatively, the highest warning level may be repeatedly indicted until a break is observed.

An alarm condition can be indicated through visual or audio means or a combination thereof. The alarm's window characteristics are defined in the configuration module. The following are possible configurations:

Alarm always on top: the alarm warning window will always be visible on the user's computer screen once a alarm condition is reached;

Alarm as full screen: the alarm warning window will occupy the full screen during an alarm;

Start alarm as icon: the alarm warning window will appear as an icon on the user's screen. Double clicking this icon will restore the alarm to its normal window size;

Alarm takes focus: the alarm warning window will assume control of the keyboard and mouse upon an alarm condition;

Remain after rest: the alarm program will not disappear after a rest break;

Mute all sounds: the alarm program will not play any sounds;

Show current time: the alarm program will display the current time during an alarm in the lower left corner;

Show window title bar: a title bar will appear at the top of the alarm window;

Show status bar: an indicator (e.g., horizontal scroll bars) appears to indicate how many accumulated work minutes will cause the next warning to be issued Create log file: the alarm program will keep a log of the keyboard and mouse usage for later analysis. (See Logging below).

b. Warning Modules

In addition to the warning indications listed above, the present invention provides for specialized warnings packages or modules. These warning modules are collections of sounds, pictures and text that may inform and entertain a user. A visually or audibly stimulating warning is preferred since it is more likely to entice a user to rest. More Preferable is a warning that actually encourages the user to stretch and perform some simple exercises during the rest periods.

In one embodiment, each warning module is a collection of a sound catalog, a text catalog, and a picture catalog. If the user prefers only one sound, picture, or text message, the user can bypass the catalogs and specify his preference. Alternatively, the user may desire that the catalog items be selected randomly during each alarm. These warning modules can be configured by the user using the configuration module, or they can be purchased as after-market components. It is anticipated that businesses may compile such warning modules as a means of advertising products and educating consumers.

c. Busy Allowance

In most cases, a warning is triggered because the user is typing or drawing at a high rate while concentrating on the task at hand. It would be difficult to suddenly lose concentration and stop all work when the warning occurs. The busy allowance timer therefore provides a grace period wherein the user can continue working without interruption. With busy allowance set, the warning will be initiated and the system will beep up periodically until the user stops using the system. Once a the user is idle or the busy allowance timer expires (configurable), the warning will be activated. Busy allowance is configured by the user. When set to zero, there is no busy allowance before warnings.

d. Logging

The monitor system also may comprise logging means for recording user activity. If selected, every minute the monitoring device logs the current number of mouse seconds and keystrokes into a log file. These logs can be used to monitor user performance and work habits. For example, in one embodiment, the log file contains one entry per minute in the following format: ddd hhmmss kc mc kw ku mu mw sit chksum Where:
ddd day of year (1–66)
hhmmss hours, minutes and seconds of the day
kc key count from the last minute
mc mouse count from the last minute
kw key warning level
ku key work minutes on the way to the next warning
mu mouse work minutes on the way to the next warning
mw mouse warning level
sit sit time in minutes
chksum checksum value used to prevent log tampering Other possible log entries include start time and warning messages. It should be understood, that the log record is configurable according to the user's need.

3. Configuration Module

The present invention provides for a system that is fully configurable to suit the needs of a particular user. Configurable parameters include the work and rest limits for keystrokes and mouse usage, the alarm limits, the effect of a work period on the activity status (first function) for the mouse and keyboard, and the effect of rest period on the activity status (second function) for the mouse and keyboard. Additionally, the configuration module can be used to select the preferred warning indication, or to generate warning modules specific to a user's interests.

Aside from operating parameters, the environment aspects of monitoring system are also flexible, and may be customized in many ways to create unique and personal versions that are sensitive to the user's situation. The user can set the monitoring device to automatically start with Windows, or what ever operating system is being used, always keep warnings on the top of the user's Windows "desktop," or the equivalent, cover the full screen area or just a small area, operate as an icon-only warning service, remain visible at all times or just during warnings, play sound files during warnings (randomly if desired), display pictures during warnings (randomly if desired), display messages during warnings (randomly if desired), maintain catalogs of messages/sounds/pictures, display the current time in addition to remaining break time, appear in user designed views including color selection, and beep any number of seconds prior to interruption by an warning.

Obviously, numerous modifications and variations of the present invention are possible in the light of the above teachings. For example, the steps may performed in any order, and other methods of accounting for the activity and rest as a function of time may be developed. Moreover, the monitoring system may be configured to monitor a user's performance and provide an indication of the user's activity rate for evaluation purposes. Indeed, the invention is useful in any application where monitoring activity rate of a user is important. It is therefore understood that within the scope of the appended claims, the invention may be practiced otherwise than as specifically described herein.

What is claimed is:

1. A method for monitoring a user's activity rate on a computer, said computer having a processor, input means, and memory having an initialized activity status indicator, said computer being configured by instructional means resident in said memory to perform said method comprising the steps of:

measuring the activity of said input means over a time period to determine an activity rate;

comparing said activity rate to at least one limit selected from the group consisting of a work limit and a rest limit, if said activity rate is greater than said work limit, then adjusting said activity status indicator according to a first function, if said activity is less than said rest limit, then adjusting said activity status indicator according to a second function; and signaling a warning if said activity status indicator reaches a predetermined alarm level.

2. The method of claim 1, wherein a plurality of warnings is used, each warning corresponding to a different alarm level having a particular severity.

3. The method of claim 1, further comprising:

delaying said warning either until said input means is idle, or after a predetermined period of time elapses.

4. The method of claim 1, further comprising:

measuring time between idle time of said input means, and signalling a stretch warning when said time reaches a predetermined time limit.

5. The method of claim 1, wherein said warning involves generating pictures, text, or sounds using at least one warning module.

6. The method of claim 5, wherein said module is a discrete module.

7. The method of claim 3, further comprising:

outputting a log based on said activity rate.

8. A device for monitoring a user's input activity, said device comprising:

means for initializing an activity status indicator;

means for measuring the activity of a user's input means over a time period to determine an activity rate;

means for comparing said activity rate to at least one limit selected from the group consisting of a work limit and a rest limit, if said activity rate is greater than said work limit, then adjusting said activity status indicator according to a first function, if said activity is less than said rest number, then adjusting said activity status indicator according to a second predetermined function; and means for signaling a warning if said activity status indicator reaches a predetermined alarm level.

9. The device of claim 8, wherein a plurality of warnings is used, each warning corresponding to a different predetermined alarm level having a particular severity.

10. The device of claim 8, further comprising:

means for delaying said warning either until said input means is idle, or after a predetermined period of time elapses.

11. The device of claim 8, further comprising:

means for measuring time between idle time of said input means and signaling a stretch warning when said time reaches a predetermined time limit.

12. The device of claim 8, further comprising:

at least one warning module having means for generating pictures, text, or sounds when said warning is signaled.

13. The device of claim 12, wherein said module is a discrete module.

14. A warning module for use with a system that monitors a user's input activity, said system comprising means for initializing an activity status indicator;

means for measuring the activity of a user's input device over a time period to determine an activity rate;

means for comparing said activity rate to at least one limit selected from the group consisting of a work limit and a rest limit, if said activity rate is greater than said work limit, then adjusting said activity status indicator according to a first function, if said activity is less than said rest number, then adjusting said activity status indicator according to a second predetermined function; and means for signaling a warning if said activity status indicator reaches a predetermined alarm level;

said warning module comprising:

means for generating pictures, text, or sounds in response to said means for signaling.

15. A computer-readable medium for configuring a computer having a processor, memory, and input means to monitor a user's input activity on said input means, said medium comprising instructional means for:

initializing an activity status indicator;

measuring a user's activity on said input means over a predetermined duration to determine activity rate;

comparing said activity rate to at least one limit selected from the group consisting of a work limit and a rest limit, if said activity rate is greater than said work limit, then adjusting said activity status indicator according to a first function, if said activity is less than said rest limit, then adjusting said activity status indicator according to a second function; and signaling a warning if said activity status indicator reaches a predetermined alarm level.

16. The medium of claim 15, wherein a plurality of warnings is used, each warning corresponding to a different alarm level having a particular severity.

17. The medium of claim 15, further comprising instructional means for:

delaying said warning either until said input means is idle, or after a predetermined period of time elapses.

18. The medium of claim 15, further comprising instructional means for:

measuring time between idle time of said input means and signaling a stretch warning when said time reaches a predetermined time limit.

19. The medium of claim 16, further comprising instructional means for:

generating pictures, text, or sounds using at least one warning module.

* * * * *